united States Patent Office 3,298,654
Patented Jan. 17, 1967

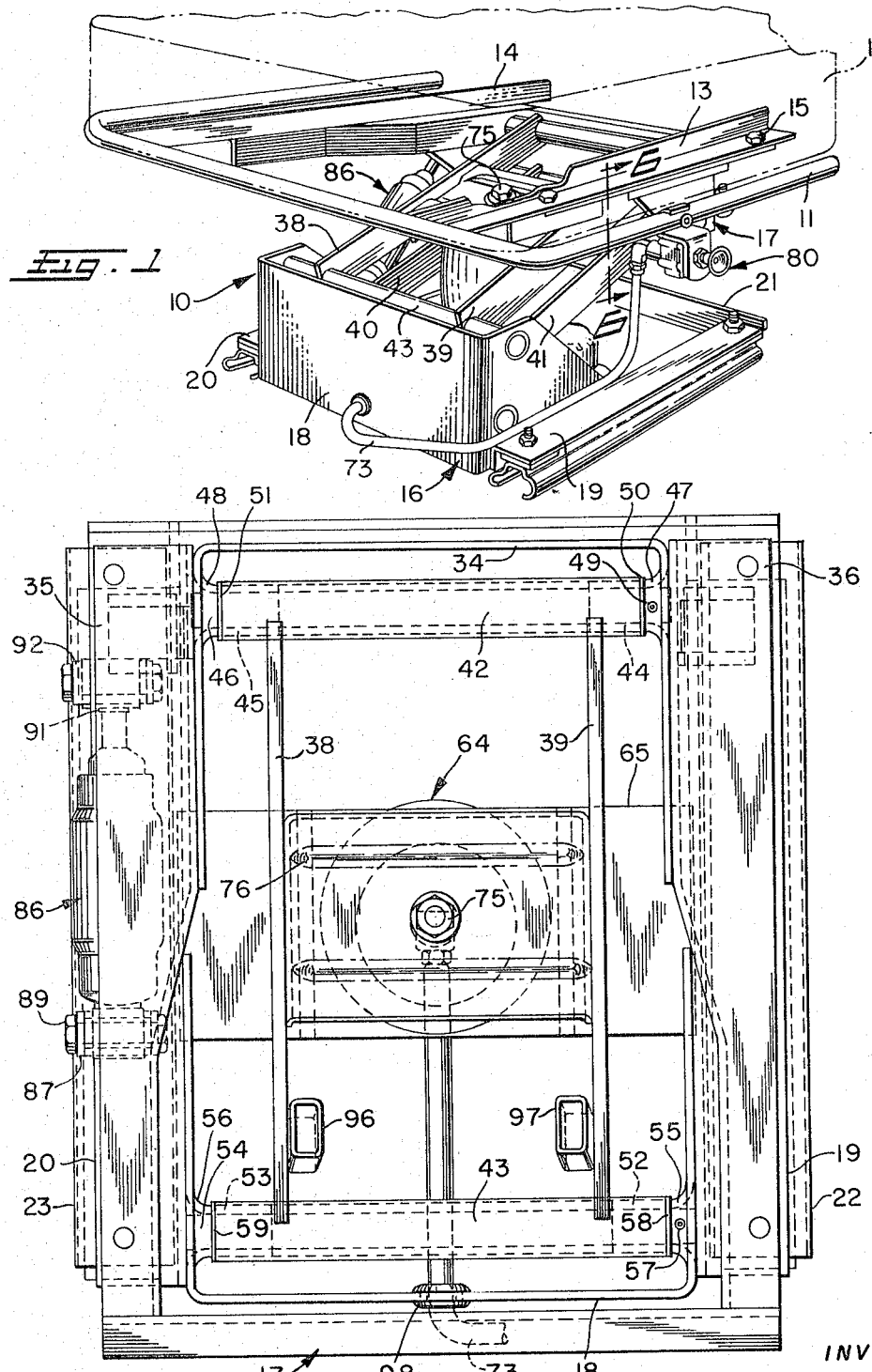

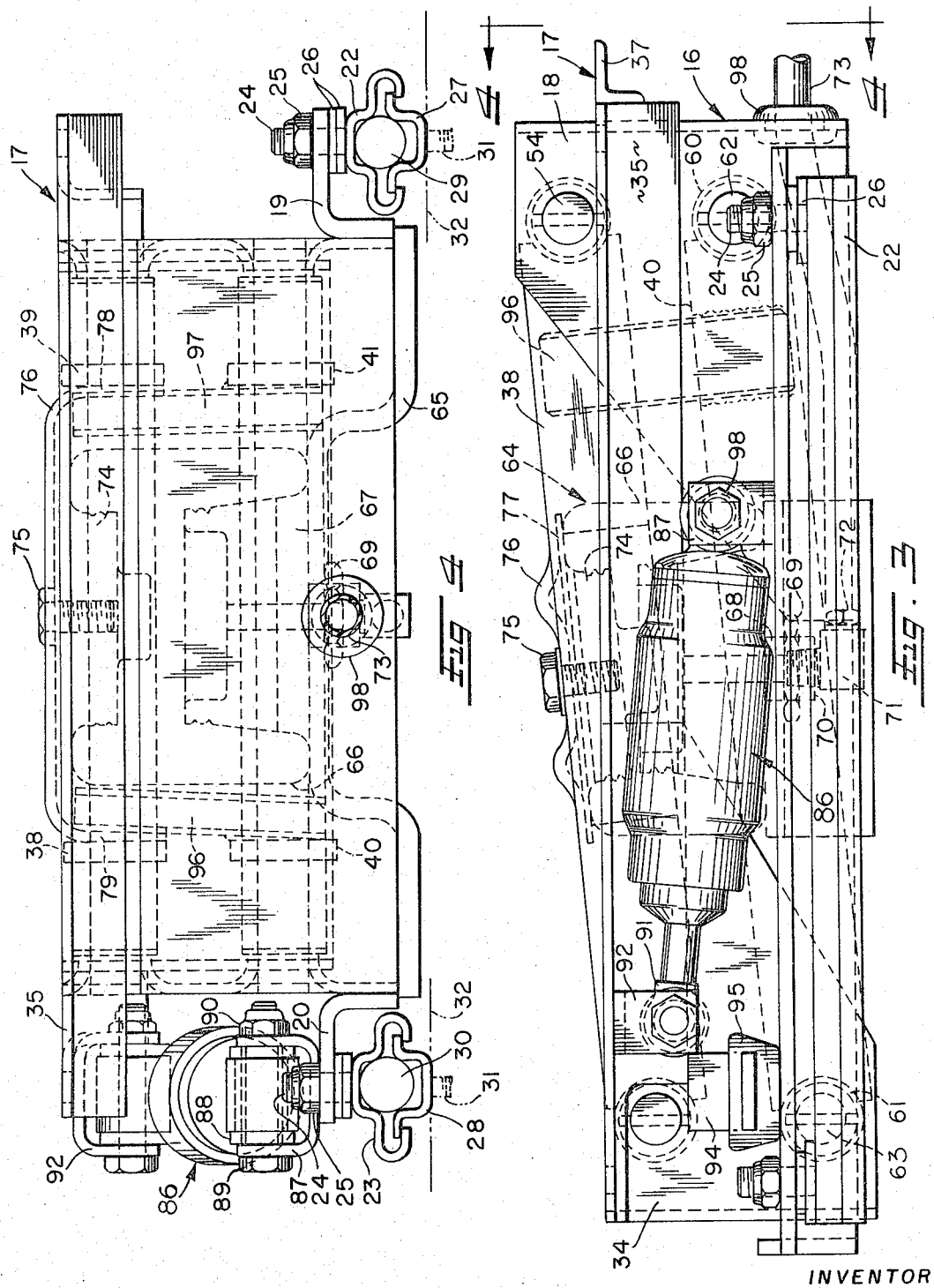

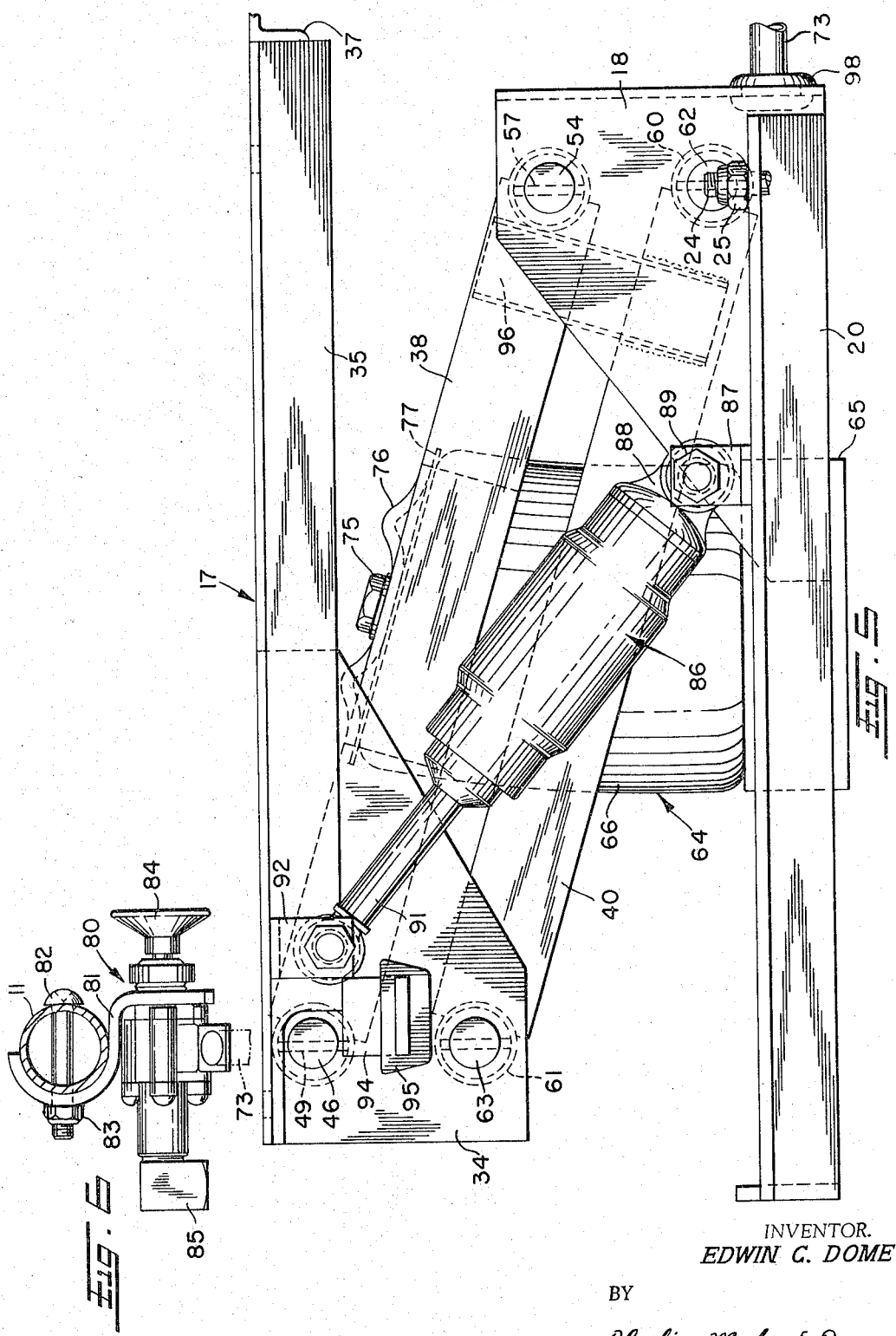

3,298,654
VEHICLE SEAT SUPPORT
Edwin C. Dome, Lucas, Ohio, assignor to Artnell Company, Chicago, Ill., a corporation of Delaware
Filed Feb. 15, 1965, Ser. No. 432,703
3 Claims. (Cl. 248—400)

The present invention relates as indicated to a vehicle seat support and relates more particularly to a fluid spring seat support construction finding particularly advantageous use in vehicles such as trucks, buses and the like.

In the past the normal coil spring support arrangements for trucks, buses and possibly other relatively heavy vehicles posed a continuous and persistent problem owing to their inability to satisfactorily absorb the shock and vibratory loads encountered in normal use of the vehicles. More recently, the use of fluid supporting systems, for example, pneumatic spring supporting assemblies, have been employed to overcome the noted objections to the older type coil spring supports. Although generally satisfactory, present fluid support assemblies are objectionable in certain respects. Initially, the fluid support equipment is characteristically relatively complex in construction and consequently relatively costly in manufacture. Secondly, the opposed ends of the fluid springs are normally directly connected to the vehicle floor and the seat frame whereby the vertical adjustability of the seat is limited to the vertical adjustability of the fluid spring itself. Still further, the fluid spring support assemblies are often rather extensive in height and thus the use thereof is rather restricted in cab conditions where available head room is a primary consideration.

With the above in mind, an object of the present invention is to provide a novel fluid spring seat support vertically adjustable to the height desired, with the ride condition being simultaneously automatically set for any individual user.

A further object of the present invention is to provide a fluid spring seat support having a relatively reduced vertical dimension thereby to accommodate lower headroom conditions.

A further object of the present invention is to provide a fluid spring seat support constructed and arranged in a novel manner to permit vertical adjustment of the support, and thus the seat attached thereto, a distance substantially in excess of the vertical adjustability of the fluid spring itself.

A further object of the present invention is to provide a fluid spring seat support which is simple and rugged in construction, economical to manufacture, and which is provided with air control means readily accessible at the side of the support.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a fragmentary, perspective view of the fluid spring seat supoprt of the present invention, with the seat being shown in dashed lines mounted on such support;

FIG. 2 is a top plan view of the fluid spring seat support itself, with the seat and tubular support for the seat being omitted from this view better to expose the support construction;

FIG. 3 is a side elevational view of the fluid spring seat support;

FIG. 4 is an end elevational view of the fluid spring seat support, looking in the direction indicated by line 4—4 of FIG. 3;

FIG. 5 is a side elevational view similar to FIG. 3 showing, however, the movable frame of the support in its raised position, and FIG. 6 is an enlarged, isolated view showing the control valve for controlling the fluid pressure within the fluid spring, and the manner in which the control valve is mounted.

Referring now in more detail to the drawings, wherein like parts have been indicated by like reference numerals, and initially to FIG. 1, the fluid spring seat support of the present invention is generally indicated at 10 and is adapted to receive and rigidly support a tubular, generally U-shaped frame member 11 which in turn mounts a lower cushion portion of a seat 12. The seat 12 can be mounted on the tubular frame member 11 in any suitable, known manner, and the tubular frame member 11 is operatively attached to the top, movable frame of the supoprt 10. In the form shown, the tubular frame member 11 has attached thereto L-shaped angle members 13 and 14 which extend front to rear relative to the support 10 and include horizontal leg portions which overlie the top of the movable frame of the support and are secured thereto by mounting bolts commonly designated at 15. In this manner, the seat 12 and tubular frame member can be simply and quickly mounted on or removed from the support 10.

The support 10 includes a stationary lower frame assembly generally indicated at 16 and a movable upper frame assembly generally indicated at 17. The stationary lower frame assembly 16 comprises a generally U-shaped upright frame member 18, with generally L-shaped angle members 19 and 20 being rigidly secured, for example by welding or bolting, to the respective sides of the upright frame member 18 and extending rearwardly thereof. A back frame member 21 extends between and is interconnected at opposite ends to the angle members 19 and 20 to form therewith and with the upright frame member 18 a generally box-shaped stationary frame assembly.

Although it will be understood that the stationary lower frame assembly 16 can be mounted on the floor of the vehicle or the like in any suitable manner, the assembly is preferably mounted as shown in FIG. 4. Upper track members 22 and 23 are carried by the side frame members 19 and 20. A plurality of threaded studs commonly designated at 24 are anchored in the top section of the track members 22 and 23 and extend upwardly through openings provided therefor in the horizontal leg portions of the side frame members 19 and 20. Nut members commonly designated at 25 are provided for securing the connection, with spacing washers commonly designated at 26 being employed to suitably space the top portion of the track members 22 and 23 from the members 19 and 20.

Lower track members 27 and 28, respectively, are constructed and arranged to interfit at the respective end portions thereof within the lower sections of the upper track members 22 and 23. The lower track members 27 and 28 each carry supporting tubes 29 and 30 which support the upper track members 22 and 23 and permit movement of the latter relative thereto for adjustment of the entire support 10 in a front-to-rear direction. The lower track members 27 and 28 in the form shown mount threaded studs commonly designated at 31 which extend downwardly through openings formed in the floor 32 of the vehicle or the like for receiving suitable fastening means (not shown) for rigidly mounting the lower frame assembly in place.

The upper frame assembly 17 comprises a generally U-shaped frame member 34, side frame members 35 and 36 rigidly secured to the frame member 34, and a front frame member 37 which extends between and is rigidly secured to the frame members 35 and 36 to form a generally rectangular assembly. The tubular frame member 11 which supports the seat 12 is attached to the respective side members 35 and 36 of the movable frame 17 in the manner described above.

The movable, upper frame assembly 17 is pivotally connected to the stationary, lower frame assembly 16 by a pair of upper connecting arms 38 and 39 and a pair of lower connecting arms 40 and 41 which are mounted parallel thereto. Each of the upper and lower pairs of connecting arms is pivotally mounted on the respective upper and lower frame assemblies in generally the same manner. Referring to the mounting of the upper connecting arms 38 and 39, as best shown in FIG. 2, the opposite ends of such arms are rigidly attached to tubular sleeve members 42 and 43. The opposite ends of the tubular sleeve 42 are mounted on sleeve bearings 44 and 45, with the bearings in turn being mounted around bearing shaft 46. The opposite ends of such shaft extend outwardly from the ends of the connecting sleeve 42 into openings formed by portions 47 and 48 struck from the frame member 34. The shaft 46 is fixed from rotation relative to the frame member 34 by pin 49 which extends through the shaft and the struck portion 47. Thrust washers 50 and 51 are disposed around the shaft 46 between the ends of the sleeve 42 and the struck portions 47 and 48 of the frame member 34.

The connecting sleeve 43 at the opposite ends of the connecting arms 38 and 39 is mounted in a similar manner. Bearings 52 and 53 are mounted within the sleeve 43 at opposite ends thereof for receiving shaft 54, with the latter extending outwardly of the ends of the connecting sleeve through openings formed in portions 55 and 56 struck from the upright frame member 18 of the lower frame assembly 16. Pin 57 extends through one end of the shaft 54 and through openings in the struck portion 55 of the frame member 18 thereby pinning the shaft thereto. Thrust washers 58 and 59 are similarly provided at the ends of the sleeve 43. It will thus be seen that when the upper connecting arms 38 and 39 are pivotally raised or lowered by means to be presently described, the sleeve 43 will rotate relative to the fixed shaft 54 and the arms 38 and 39 will pivot about the axis of the shaft 54.

The lower connecting arms 40 and 41 are similarly pivotally connected at their opposite ends to the respective lower and upper frame assemblies 16 and 17. Thus, the opposite ends of the arms 40 and 41 are mounted to tubular sleeves 60 and 61, shown in dashed lines in FIGS. 3 and 5, which are in turn pivotally mounted on shafts 62 and 63. The shafts 62 and 63 are in turn pinned to the frame members 18 and 34, respectively, in the manner previously described.

A fluid spring member generally indicated at 64 is operatively connected at its lower end to the stationary, lower frame assembly 16 by means of a generally channel-shaped supporting member 65 disposed intermediate the front and rear of the side frame members 19 and 20 and rigidly secured thereto in any suitable manner, for example by welding, as indicated. The fluid spring 64 comprises an elastomeric housing 66 which is provided internally with a generally cylindrical bottom coupling 67 having a downwardly extending threaded nipple 68 which extends through an opening in support member 65 and is externally threaded for receiving nut member 69. The bottom of the fluid spring 64 is thus rigidly connected to the bottom stationary frame assembly.

The coupling 67 and the threaded nipple 68 are internally bored and the nipple is threaded to receive the threaded upper end 70 of a fitting 71 the opposite end 72 of which is adapted to receive a flexible air hose 73. Air is thus supplied by the hose 73 upwardly through the nipple and coupling to the interior of the fluid spring 64 for inflating the same.

The fluid spring 64 is provided adjacent its upper end with a similar coupling 74 which is internally threaded to receive a top mounting bolt 75. The latter extends through openings in a top plate member 76 and a relatively large washer 77 disposed beneath the plate 76 on the top of the fluid spring 64. As best shown in FIG. 4, the plate 76 is of generally inverted U-shape with the opposed, downwardly depending leg portions 78 and 79 thereof being rigidly secured to the upper connecting arms 38 and 39, respectively, in any suitable manner, for example by welding. Tightening of the mounting bolt 75 thus firmly mounts the upper end of the fluid spring 64 to the upper connecting arms whereby movement of the fluid spring in response to inflation or deflation thereof effects movement of the upper connecting arms and thus the upper movable frame 17 operatively connected thereto.

As best shown in FIG. 6, an air control valve generally indicated at 80 is mounted by means of a bracket 81 on the tubular frame member 11 which mounts the seat 12, with a bolt or the like 82 extending through aligned openings in the tubular member 11 and bracket 81, with nut 83 securing such mounting. The valve 80 includes a control button 84 which can be moved inwardly or outwardly to condition the valve for air supply or exhaust. A fitting 85 is adapted to be connected to a suitable source of air for admitting air to the valve and to the supply line 73 connected thereto with the latter being shown in dashed lines.

A shock absorber generally indicated at 86 is operatively connected at opposite ends to the lower and upper frame assemblies 16 and 17 respectively, for dampening the movement of the movable upper frame assembly. As best shown in FIGS. 3 and 4, a generally U-shaped bracket 87 is mounted on the side frame member 20 and the lower, tongue end portion 88 of the shock absorber is pivotally connected thereto by means of pin 89 and nut 90. The opposite, piston end 91 of the shock absorber 86 is similarly pivotally mounted to a generally U-shaped bracket 92 mounted on and depending downwardly from the side frame member 35 of the upper frame 17 whereby the piston 91 of the shock absorber is movable therewith.

The generally U-shaped frame member 34 of the movable upper frame assembly 17 has mounted thereon at opposed sides thereof means to limit the vertically downward movement of the upper assembly and thus the seat 12. A generally L-shaped bracket 94 is rigidly secured at each side of the frame member 34 and the horizontally extending leg portion thereof carries a stop member 95 made, for example, of rubber or other suitable material. The stop members 95 extend laterally over the frame members 19 and 20 of the stationary lower frame assembly 16 and contact the same when the upper movable frame descends thereby to limit such descent.

The vertically upward movement of the upper frame assembly and thus the seat 12 is limited by means of generally vertically directed stop attachments 96 and 97 and lower ends of which are rigidly secured respectively to the lower connecting arms 40 and 41. As shown in FIG. 5, the upper ends of the stop attachments 96 and 97 contact the connecting sleeve 43 effectively to limit the upward movement of the lower connecting arms 40 and 41, and thus the upper frame assembly 17, when the fluid spring is inflated.

The air supply line 73 extends through a grommet 98 mounted in an opening formed in the front wall of the generally U-shaped member 18 of the lower frame assembly 16, with the air supply line 73, as described above, being connected to the fluid spring 64 through fitting 71.

The manner in which the seat 12 can be vertically adjusted should be apparent from the above description. Assuming the movable frame 17 is in its lowermost position, shown in FIG. 3, wherein the side frame members 35 and 36 are actually disposed below the top of the frame member 18 of the lower frame assembly 16, to raise the seat 12 the valve 80 is set for inflation of the fluid spring 64 through proper manipulation of the control button 84. Air is directed through the fitting 85, control valve 80, the air supply house 73 and the fitting 71 to the interior of the fluid spring 64 to inflate the same. The upper end of the fluid spring is connected to the upper connecting arms 38 and 39 which, as a result, pivot upwardly about an axis through the bearing shaft 54. The upper connecting arms 38 and 39 thereby carry upwardly the movable frame assembly 17 and the seat 12 mounted thereon. By regulating the degree of inflation of the fluid spring, the seat 12 can be vertically adjusted to the proper height for the driver, with the maximum vertically raised position of adjustment being shown in FIG. 5. By merely adjusting the vertical height, the condition of ride for the driver is automatically set, with the weight of the driver slightly compressing the fluid spring to provide the desired cushioning effect. To deflate the fluid spring 64, the control button 84 of the valve 80 is manipulated to an exhaust position and the air exhausted from the fluid spring until the seat reaches its desired vertical position.

It will be readily apparent from a comparison of FIGS. 3 and 5 that the vertical adjustability of the upper frame 17, and thus the seat 12 secured thereto, is substantially in excess of the expansibility of the fluid spring 64. In the form shown, wherein the bottom of the fluid spring 64 is operatively secured to the bottom stationary frame assembly 16 and the upper end of the fluid spring is operatively connected to the upper connecting arms 38 and 39, the range of adjustment of the upper frame is approximately double the expansibility of the fluid spring. It will be understood that the exact ratio of vertical adjustment of the upper frame assembly 17 to expansion of the fluid spring can be varied to a degree by varying the mounting of the fluid spring on the supper connecting arms 38 and 39 from their fixed pivot axes about the shaft 54. Although the support base of the present invention thus provides a substantial range of vertical adjustment, the entire unit, in a deflated position as shown in FIG. 3, is relatively flat thereby to readily accommodate the same to substantially all truck cab headroom conditions. Moreover, the unit is relatively simple, yet rugged, and can be economically manufactured.

Other modes of applying the principle of the invention may be employed, change being made as regards the details described, provided the features stated in any of the following claims or the equivalent of such be employed.

I therefore particularly point out and distinctly claim as my invention:

1. A vehicle seat support comprising a stationary base frame having a generally U-shaped base mamber, a movable frame vertically adjustable relative to said stationary base frame, said movable frame including a generally U-shaped frame member and side frame members rigidly secured thereto adapted to receive a seat frame forming part of said seat, said side frame members of said movable frame being laterally spaced to clear the exterior of said U-shaped base member when said movable frame is lowered to permit said side frame members to descend to a position below the top region of said U-shaped base member, a pair of upper connecting arms pivotally connected at opposite ends thereof to said U-shaped frame member of said movable frame and to said U-shaped base member, a pair of lower connecting arms disposed parallel to said upper arms and pivotally connected at opposite ends to said U-shaped base member and to said U-shaped frame member of said movable frame, resiliently expansible fluid spring means provided with an elastomeric housing, said spring means having an upper end mounted to said upper connecting arms and a lower end mounted to said stationary base frame, and valve means for controlling the fluid pressure within said fluid spring thereby to control the vertical adjustment of said movable frame.

2. The combination of claim 1 wherein the upper end of said fluid spring means is mounted to said upper connecting arms generally intermediate the lengths thereof whereby the vertical movement of said movable frame is approximately double the vertical expansion of said fluid spring.

3. The combination of claim 1 further including means carried by said lower connecting arms and said movable frame for limiting the vertically upward and downward movement, respectively, of said movable frame.

References Cited by the Examiner

UNITED STATES PATENTS

| | | | |
|---|---|---|---|
| 2,821,239 | 1/1958 | Brendel | 248—400 X |
| 2,961,033 | 11/1960 | Galbraith | 248—377 |
| 3,150,855 | 9/1964 | Carter et al. | 248—400 |

CLAUDE A. LE ROY, *Primary Examiner.*

R. P. SEITTER, *Assistant Examiner.*